Figure 1:
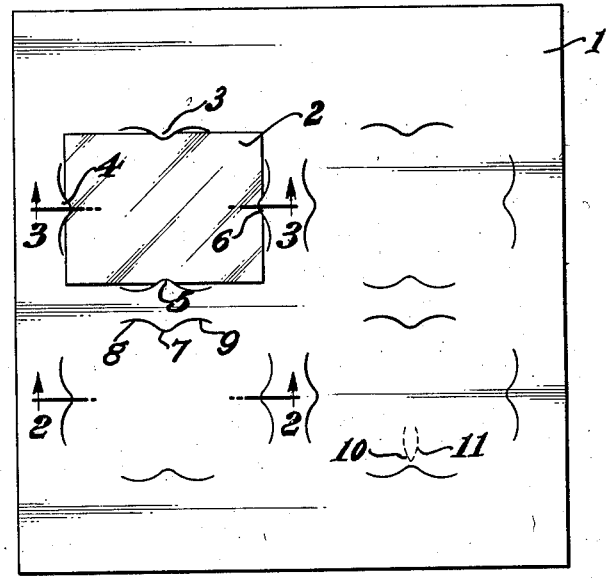

July 15, 1958   N. GREENE ET AL   2,842,882
PHOTOGRAPHIC MOUNT FOR X-RAY FILM
Filed Aug. 27, 1954

INVENTORS,
Nathan Greene and Rose Greene;
BY
Attorney.

United States Patent Office 2,842,882
Patented July 15, 1958

2,842,882

PHOTOGRAPHIC MOUNT FOR X-RAY FILM

Nathan Greene and Rose Greene,
North Hollywood, Calif.

Application August 27, 1954, Serial No. 452,494

1 Claim. (Cl. 40—158)

The present invention relates to photographic mounts for X-ray film, and has for an object the provision of a mount having spaced tabs which hold the X-ray film securely and without tab breakage.

It is common in the art to provide a mount for X-ray film, which is formed of some material, such as a plastic. This plastic mount may be transparent, translucent, or, in certain instances, may have transparent windows surrounded by areas which are blacked-out.

The X-ray pictures are secured over the window portions of the mount, usually by providing slits at spaced points on the mount, whereby upper and lower tabs and side tabs are provided for overlapping the edges of the X-ray film. However, as the mount tears easily, the lifting of the tabs often causes breakage of the mount at this zone, with the result that the mount, due to mutilation, must be replaced. Generally, in mounts for dental radiographs, the slits are in back-to-back relationship, and such construction will, in the event the tab along one slitted portion is unduly raised by the operator during the insertion of an X-ray photograph, cause a tearing into the opposite slit, resulting in a large hole or opening in the mount.

An object of the present invention is to so arrange and form the slits in the X-ray mount as to prevent tearing of the mount when the tab portions are raised to hold the X-ray film.

Figure 2:
Figure 3:

In the drawing:

Figure 1 is a plan view of an X-ray photographic mount incorporating the invention, Figure 2 is a sectional view on the line 2—2 of Figure 1, and, Figure 3 is a sectional view on the line 3—3 of Figure 1.

Referring now to the drawing, we have shown at 1, a photographic mount of the type which will hold four X-ray films, one of the X-ray films being shown at 2. To hold the X-ray film on the mount, tabs are formed in the mount, as shown at 3, 4, 5 and 6, for overlapping edges of the X-ray film, as shown in Figures 1 and 3. It is to be observed that the tabs 4 and 6 overlap the side edges of the X-ray film, while tabs 3 and 5 overlap the top and bottom edges of the film. In this manner, the film is secured to the mount. That area of the mount over which the X-ray film is placed and held by the tabs is usually termed a "window."

In the forming of the tabs, the mount is provided with slits of a curved, sinuous character, which is to say, provided with a central concavo-convex portion 7, the slit bounding which merges with curved end convex-concavo slits 8 and 9. The degree of arc of curvature is greater for the slits 8 and 9 than for the portion 7. Thus, if the curved portions 8 and 9 were continued so as to intersect, the intersecting portion, instead of being angular, is rounded. This is illustrated by the dotted lines at 10 and 11, in Figure 1, which indicates a continuance of the curvature of the slits, and which shows that, instead of the abrupt angle, that the slit is curved at the intersection, and in this manner a tab is formed. In order to accommodate the greatest number of photographic mounts, the slits are in what may be defined as a back-to-back relationship, so that in the case of a full dental radiograph, there will be space for X-ray photographs of the various areas of teeth.

The operation, uses and advantages of the invention are as follows:

By forming the slit on a curve on each side of the tab, with the side slits sub-tending a greater arc than that of the head of the tab, the fingers may engage the tab to raise the same, in the manner shown in Figure 3, at 12, with safety, for the reason that the curved slits 8 and 9 distribute stress and prevent tearing of the photographic mount.

We claim:

A photographic mount for generally rectangular dental X-ray films including a blank of plastic material which is easily tearable at each end of a cut made in the plastic, said blank having therein four spaced slits, each of which by extending generally in the direction of a side of the dental film to be retained in the mount provides a central inwardly directed tab to overlie a respective side of the film and the four slits leave the four corners of the film free, each of the two sides of each slit adjacent the tab curving away from the central tab, the ends of each of the slits being directed inwardly of the proximate margin of the film whereby to minimize tearing because of the wide slits formed by the curves when the tab is pressed up to receive the film, and to insure that if a tear is formed the tear will extend under the mounted film rather than in a direction away from the margin of the film.

References Cited in the file of this patent

UNITED STATES PATENTS

| 1,210,215 | Satterlee | Dec. 26, 1916 |
| 1,410,130 | Sinclair | Mar. 21, 1922 |
| 1,474,174 | Segall | Nov. 13, 1923 |
| 1,853,197 | Bosworth | Apr. 12, 1932 |
| 2,524,306 | Buzzerd | Oct. 3, 1950 |
| 2,532,132 | Vogel | Nov. 28, 1950 |

FOREIGN PATENTS

| 53,924 | Denmark | Feb. 5, 1937 |